Jan. 16, 1962      J. COLEBY      3,017,253
APPARATUS FOR COUNTERCURRENT TREATMENT OF IMMISCIBLE FLUIDS
Filed March 23, 1959      3 Sheets-Sheet 1
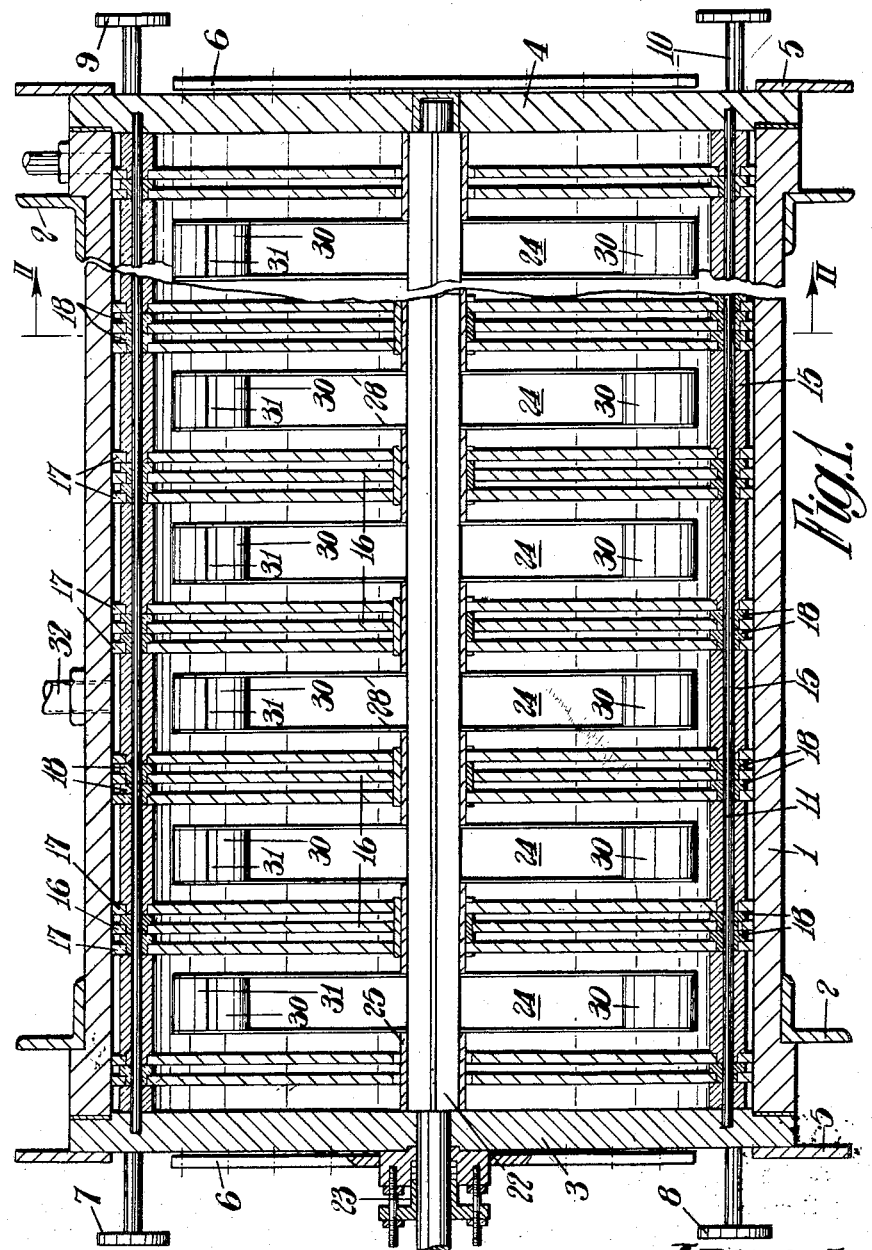
Inventor
J. Coleby Jan. 16, 1962   J. COLEBY   3,017,253
APPARATUS FOR COUNTERCURRENT TREATMENT OF IMMISCIBLE FLUIDS
Filed March 23, 1959   3 Sheets-Sheet 2
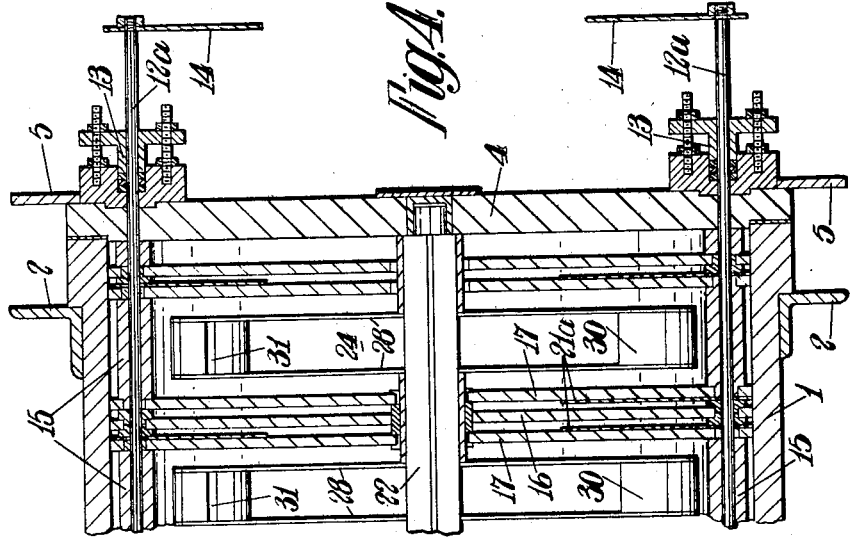
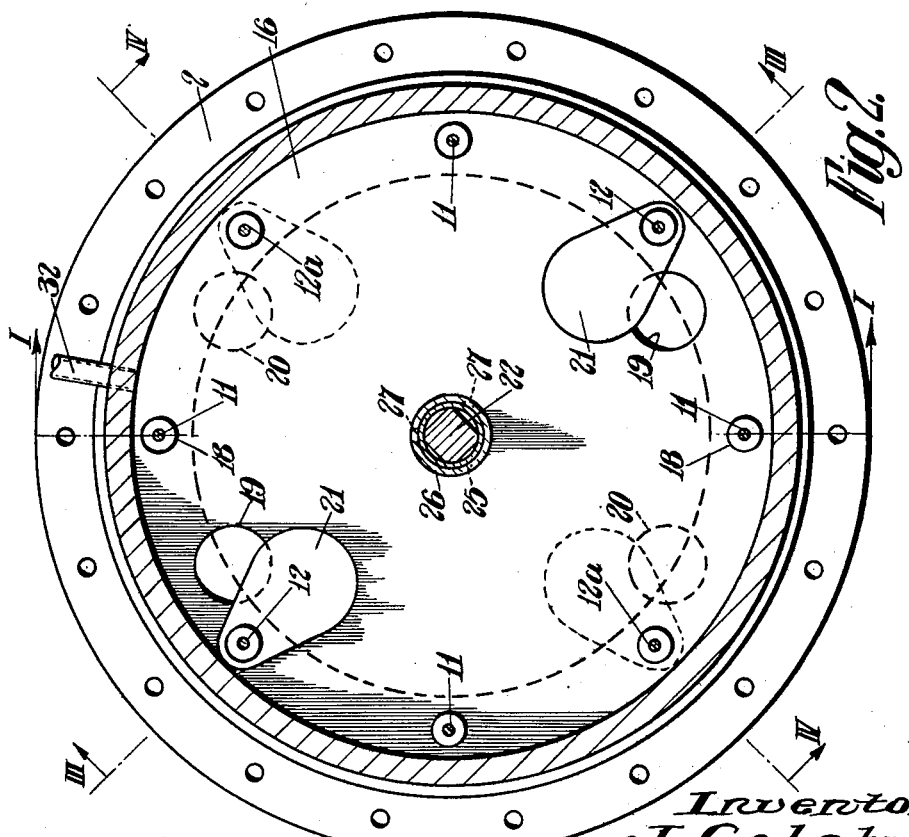
Inventor
J. Coleby

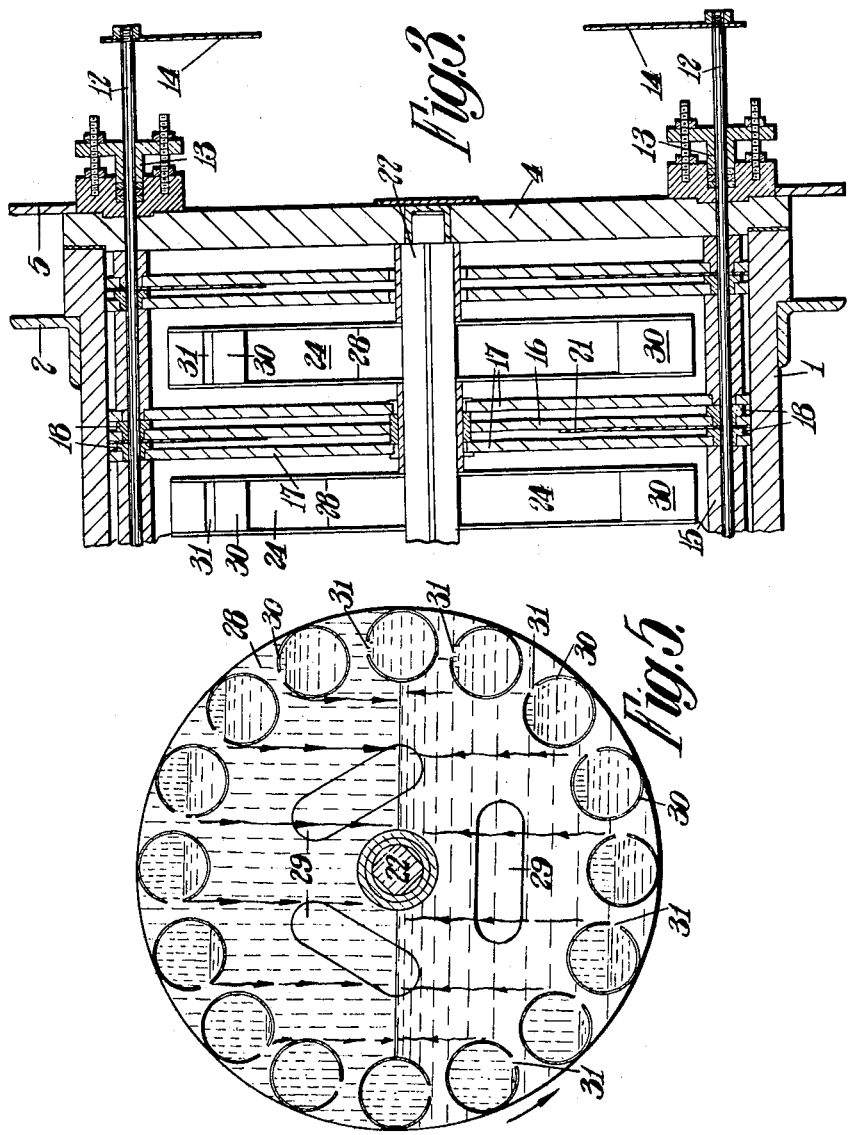

United States Patent Office 3,017,253
Patented Jan. 16, 1962

3,017,253
APPARATUS FOR COUNTERCURRENT TREATMENT OF IMMISCIBLE FLUIDS
John Coleby, Buckley, Wales, assignor to R. Graesser Limited, Chester, England, a British company
Filed Mar. 23, 1959, Ser. No. 801,305
Claims priority, application Great Britain Mar. 26, 1958
7 Claims. (Cl. 23—270.5)

This invention relates to apparatus for contacting immiscible or partially miscible liquids, for the purpose of extracting a material contained in one of the liquids. It is suitable for example for extracting phenol from water by means of benzene, or for extracting phenol sulphonic acids from a phenolic mixture by means of water.

The object of the invention is to provide an apparatus capable of carrying out extraction efficiently and economically over long periods, and capable of being readily adapted to the requirements of widely different extraction processes.

The apparatus according to the invention comprises a container through which the liquids can flow in countercurrent relationship in a substantially horizontal direction, the container being divided into alternate settling chambers and mixing chambers, the mixing chambers being provided with means for causing streams of each liquid to flow through the other liquid.

The container may be cylindrical, or it may be of square cross-section, with end plates in which may be fitted inlets and outlets for the two liquids, the lighter liquid entering the upper part of the container at one end, while the heavier liquid enters the lower part of the container at the other end.

Each settling chamber may be formed by partitions which may be three in number, spaced apart and having ports or groups of holes in their upper and lower parts for the passages of the respective liquids, the ports or groups of holes in adjacent partitions being staggered to cause the liquids to follow sinuous paths through the chambers. The flow area of the ports or groups of holes may be different for the two liquids, according to the nature of the liquids and the rates of flow required. If desired, shutters may be provided in conjunction with the ports or groups of holes, mounted on spindles which can be adjusted from outside the apparatus, in order to adapt it for different purposes or to control its operation. The ports or groups of holes may for example be centered on radii making angles of about 56° with the horizontal in the case of the outer partitions of a group of three, and of about 124° in the case of the inner partition. The partitions may if desired be made of glass.

Each mixing chamber may be of substantially greater length than the settling chambers and may contain a rotor comprising end plates with vent holes, between the peripheral parts of which are mounted a number of cylinders, each having a longitudinal slot in its curved surface, facing the direction of rotation. There may be for example 16 of these cylinders around each rotor.

Referring to the accompanying drawings:

FIGURE 1 is a longitudinal section of an extractor in accordance with the invention, on the line I—I of FIGURE 2.

FIGURE 2 is a section on the line II—II of FIGURE 1.

FIGURE 3 is a part section on the line III—III of FIGURE 2.

FIGURE 4 is a part section on the line IV—IV of FIGURE 2.

FIGURE 5 is a cross-section of a rotor.

The extractor is contained in a cylindrical container 1, supported by angle rings 2, with end plates 3, 4 held in position by backing plates 5 bolted to the rings 2. In use the apparatus is lodged at an angle of about 7° to the horizontal, in a cradle fitted with steam heating means. In each of the end plates a vertical slot is covered by a sight glass 6. In the end plate 3 there is an inlet 7 at the top for the lighter liquid and an outlet 8 at the bottom for the heavier liquid. In the end plate 4 there is an outlet 9 at the top for the lighter liquid and an inlet 10 at the bottom for the heavier liquid. The container and end plates may be made of stainless steel, synthetic plastic, or other non-corroding materials.

Eight locating rods 11, 12, 12a are spaced around the interior of the container 1 near its periphery. The four rods 11 are mounted at their ends in blind holes in the end plates 3, 4, while the pairs of rods 12 and 12a are mounted in blind holes in the end plate 3, but pass through end plate 4 and extend through glands 13 and can be turned by means of handles 14. Along the rods 11, 12 are placed spacers 15 and partitions arranged in groups of three except at the ends of the container where there are groups of two. Each group of three partitions comprises a center partition 16 and two outer partitions 17, while each end group comprises one partition 16 and one partition 17. There are spacers 18 between the partitions of each group.

Each partition 16 has two diametrically opposite ports 19, and each partition 17 has two ports 20 which are offset with respect to those of the partition 16. Each partition has one port in its upper part and one in its lower part. The rods 12, 12a carry shutters 21, 21a adjacent to the partitions 16, 17 for closing or partly closing the ports 19, 20 when turned by rotating the rods 12, 12a. The spaces between the end partitions 17 of a group, and between the end partitions 17 and the end plates 3 and 4, constitute settling chambers.

A central shaft 22 of square cross section with round parts at its ends is mounted in a gland 23, in the end plate 3 and in a blind hole in the end plate 4. In the mixing chambers formed between the groups of partitions, rotors 24 are mounted on the square shaft 22 so as to rotate therewith, the rotors 24 being spaced apart by round bushes 25 passing through central holes in the partitions. Around the bushes 25 are spacers 26 which fit in the central holes of the partitions 16 and have at each side three prongs 27 which enter recesses in the central holes of the partitions 17. No spacers are provided for the pairs of partitions at the ends of the container.

Each rotor comprises end plates 28, having elongated holes 29 for the passage of the liquids, and bucket elements 30 around the periphery of the rotor. Each bucket element 30 is in the form of a hollow cylinder with a longitudinal slot 31 along its leading side in the direction of rotation of the rotor.

There is a sampling connection 32 near the top of the container 1.

In operation, the extractor contains approximately equal amounts of two immiscible liquids with an interface near the center line of the container 1, the liquids being supplied through the inlets 7 and 10, and travelling in opposite directions to the outlets 8 and 9. The shaft 22 carrying the rotors 24 is turned at a slow speed. In the case of an apparatus of 3 feet diameter a speed of about 10 r.p.m. may be suitable, the exact speed depending on the properties of the liquids being treated. A bucket 30 leaving one liquid is filled with that liquid, and carries its contents into the other liquid. As it turns over, its contents begins to flow over at the edge of the slot 31 near the center of the rotor, and flows up or down as the case may be through the second liquid in the form of a coarse rain, being gradually displaced in the bucket by the second liquid which flows in. If desired the edge of each slot 31 may be serrated or provided with semi circular cut-outs, to assist the overflow. There may be perforations in the wall of each bucket opposite the slot, through which the liquid may trickle out.

The vertical streamings up and down, by continuously exposing fresh surfaces of each liquid, provides excellent contact without either phase losing its individuality, and the coarse state of subdivision ensures rapid disengagement at the interface.

From each mixing chamber, each liquid enters the next settling chamber through the corresponding port 20 and follows a sinuous path by way of the port 19 and the next port 20, so that there is sufficient time to allow disengagement of entrained drops. The ports are made small enough to give a velocity of flow adequate to prevent backwashing. The ports are set in the partitions at a convenient level so as to be clear of the interface and maintain a long sinuous path. The ports 20 for example may be centered on radii making angles of about 56° with the horizontal, in the direction of rotation, while the ports 19 are centered on radii making angles of about 124° with the horizontal.

There is a hydrodynamic pressure drop through the apparatus, which results in an inclination of the interface, and it is convenient to tilt the apparatus, e.g. to about 7° to the horizontal, until the interface is approximately parallel to and near to the axis of the container. By means of the adjustable shutters 21, 21a the pressure drop can be adjusted and the interface kept parallel to the axis when the tilt is constant. Preferably the pressure drop should be substantially equally distributed between the two flows, as this reduces the possibility of backwashing to a minimum.

Good results have been obtained with containers from a few inches to a few feet in diameter, using widely different flow rates of up to and over 300 gallons per hour, and up to 24 mixing chambers. In a particular case of a rotor 3 feet in diameter 16 bucket elements of 5 inches diameter and 5¾ inches length were used, the spacing of the settling chamber partitions being ¾ inch. Flow ratios of from 20 to 1 down to equal flows have been used successfully.

The following is an example of the results obtainable with an apparatus according to the invention, in the extraction of phenol from water by means of benzene.

Speed of rotation _____ 10 r.p.m.
Water throughput _____ 300 gallons/hour.
Benzene throughput _____ 200 gallons/hour.
Percent phenol in water IN $x_0$ _____ 3.63.
Percent phenol in water OUT $x_0$ ____ 0.22.
Partition of phenol P _____ 2.65 v./v. benzene/water.
Percent phenol in benzene IN _____ Trace.
Percent phenol in benzene OUT _____ 5.11.

$$\text{Extraction factor } E = P \times \frac{\text{Benzene flow}}{\text{Water flow}}$$

$$= 2.65 \times \frac{200}{300}$$

$$= 1.77$$

If $n$ = number of theoretical extraction stages then $$n+1 = \frac{\text{Log} \frac{x_0}{x_n}(E-1)+1}{\text{Log } E}$$

$$= \frac{\text{Log} \frac{3.63}{0.22}(1.77-1)+1}{\text{Log } 1.77}$$

$$n+1 = \frac{\text{Log } 13.7}{\text{Log } 1.77} = \frac{1.367}{0.248} = 5.5$$

$$n = 4.5$$

$$\text{Efficiency per compartment} = \frac{4.5}{8} = 0.56$$

If desired the flow area of the ports in the partitions may be different in the upper and lower parts of the partitions, according to the nature of the liquids and the rates of flow required. Groups of holes may be used instead of individaul ports. Instead of rotary shutters, suitably shaped plugs arranged to move axially could be used to control the flow. In any event the invention contemplates openings in each partition including at least one opening above and below the axis of the container and adjustable valve means for regulating the size of the openings.

The container need not be cylindrical. In some circumstances another cross-sectional form may be preferred, for instance it could be square, and the connections between compartments could then be located in the corners, clear of the rotors.

In a modified arrangement, instead of ports in the partitions forming a settling chamber, external pipes or ducts may be provided at the top and at the bottom of the apparatus, leading from a mixing chamber to the first part of the settling chamber, from the first to the second part of the settling chamber and from the second part of the settling chamber to the next mixing chamber.

Both of the inlet flows can be measured and automatically controlled by well known metering and pumping devices. The outward flow of one of the phases can be controlled by installing in a settling zone, preferably at one end, a sensitive device which detects the interface, and controls the outflow of the phase to maintain the interface at a pre-selected level, preferably the equator; the other phase can then flow out by hydrostatic means.

A similar sensitive device, detecting the interface, in a settling zone, preferably at the other end of the apparatus, can be used to operate the shutters and maintains a pre-selected level, preferably the equator, at this other end of the apparatus.

The sensitive device can be any which uses a difference in property of the two phases, such as electrical conductivity, dielectric constant, index of refraction, density etc.

With the above system of controls the operation of the apparatus becomes automatic.

The invention provides an efficient means of mixing which contacts each liquid in the other at different levels so that each phase remains a continuous phase and can therefore be made to flow in countercurrent in a substantially horizontal direction.

What I claim is:

1. An apparatus for the treatment of substantially immiscible liquids of differing densities, comprising a substantially horizontal container having inlets and outlets for the two liquids, a plurality of groups of axially spaced stationary partitions within the container and having regulatable openings therein including at least one opening above and below the axis of the container, each group constituting a settling chamber and the spaces between adjacent groups constituting mixing chambers, a plurality of rotors, one in each mixing chamber, each rotor comprising end plates, having peripheral parts and a plurality of axially extending cylinders disposed between the peripheral parts of the end plates and closed at their ends by the end plates, and each cylinder having a slot extending from end to end thereof parallel to its axis in a curved surface portion facing the direction of rotation of the rotor, each end plate having circumferentially spaced vent holes therein at a location between its center and said cylinders, and means for simultaneously rotating all the rotors.

2. An apparatus for the treatment of substantially immiscible liquids of differing densities, comprising a substantially horizontal container having a central axis and inlets and outlets for the two liquids, a plurality of groups of stationary partitions within the container and spaced axially along said axis, each group including a plurality of spaced apart partitions, each partition having openings therein including at least one opening above and below said axis, adjustable shutters for regulating the openings in the partitions, means coupled with said shutters for adjusting the same from the exterior of the container, the space between the end partitions of each group of partitions defining a settling chamber therebetween, the spaces between adjacent groups of partitions defining axially spaced mixing chambers, a rotor means in each mixing chamber, each rotor means comprising axially spaced end plates having openings therein including at least one opening above and below the axis of the container and a series of mutually spaced receptacles mounted between said end plates adjacent to and extending around the periphery thereof for rotation therewith, said end plates including portions closing each receptacle at the opposite ends thereof, and each receptacle having an axially extending slot in a portion facing the direction of rotation of the rotor means, and means for simultaneously rotating all said rotor means.

3. An apparatus for the treatment of substantially immiscible liquids of differing densities, comprising a substantially horizontal container having a central axis and inlets and outlets for the two liquids, a plurality of groups of stationary partitions within the container and spaced axially along said axis, each group including a plurality of spaced apart partitions, each partition having openings therein including at least one opening above and below said axis, longitudinal rods passing through the container near its periphery and supported in the ends of the container, some of said rods being rotatable, said partitions being mounted on said rods, shutters for regulating the openings in the partitions and mounted on said rotatable rods so as to be rotated therewith, the space between the end partitions of each group of partitions defining a settling chamber therebetween, the spaces between adjacent groups of partitions defining axially spaced mixing chambers, a rotor means in each mixing chamber, each rotor means comprising axially spaced end plates having openings therein including at least one opening above and below the axis of the container and a series of mutually spaced receptacles mounted between said end plates adjacent to and extending around the periphery thereof for rotation therewith, said end plates including portions closing each receptacle at the opposite ends thereof, and each receptacle having an axially extending slot in a portion thereof facing the direction of rotation of the rotor means, and means for simultaneously rotating all said rotor means.

4. An apparatus for the treatment of substantially immiscible liquids of differing densities, comprising a substantially horizontal container having a central axis and inlets and outlets for the two liquids, a plurality of groups of stationary partitions within the container and spaced axially along said axis, each group including a plurality of spaced apart partitions, each partition having openings therein including at least one opening above and below said axis, adjustable valve means for regulating the size of said openings, each group of partitions constituting a settling chamber and the spaces between adjacent groups of partitions constituting mixing chambers, a rotor means in each mixing chamber, each rotor means comprising axially spaced end plates having openings therein including at least one opening above and below the axis of the container and a series of mutually spaced receptacles mounted between said end plates adjacent to and extending around the periphery thereof for rotation therewith, said end plates including portions closing each receptacle at the opposite ends thereof, and each receptacle having an axially extending slot in a portion thereof facing the direction of rotation of the rotor means, and means for simultaneously rotating all said rotor means.

5. An apparatus as claimed in claim 4, in which each group of partitions that is between adjacent mixing chambers comprises three axially spaced partitions constituting one of said settling chambers, and the openings in adjacent ones of said three partitions being staggered to cause the liquids to follow in sinuous paths through the settling chambers.

6. An apparatus as claimed in claim 4, in which the means for simultaneously rotating said rotor means, includes a rotatable shaft extending axially through the container and passing through the partitions, and said rotor means being mounted on said shaft.

7. An apparatus as claimed in claim 6, in which the part of said rotatable shaft between the ends of the container is square, and circular bushings carried by said square part and passing through the partitions of each group for spacing adjacent rotor means apart.

References Cited in the file of this patent

UNITED STATES PATENTS

| | | |
|---|---|---|
| 2,234,921 | Webb | Mar. 11, 1941 |
| 2,390,388 | Rector | Dec. 4, 1945 |

FOREIGN PATENTS

| | | |
|---|---|---|
| 501,344 | Canada | Apr. 6, 1954 |